Feb. 21, 1933.  A. J. EVANS  1,898,820
BRAKE MECHANISM
Filed Oct. 13, 1930   2 Sheets-Sheet 2

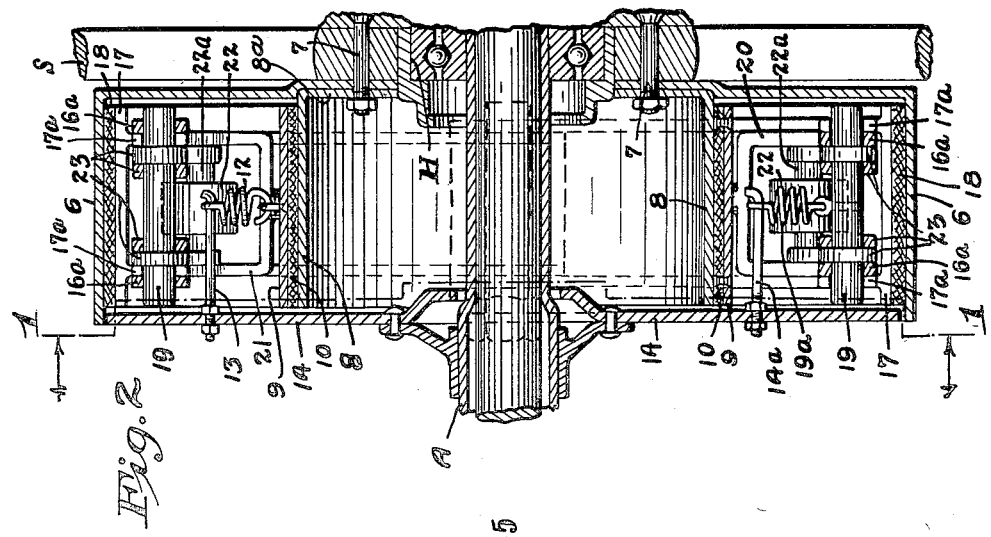

Inventor
Amos J. Evans
By his Attorneys
Williamson & Williamson

Patented Feb. 21, 1933

1,898,820

UNITED STATES PATENT OFFICE

AMOS J. EVANS, OF MINNEAPOLIS, MINNESOTA

BRAKE MECHANISM

Application filed October 13, 1930. Serial No. 488,345.

This invention relates to brake mechanisms and is especially adapted for brakes associated with the wheels of a motor vehicle, although applicable to other rotary elements.

It is an object of my invention to provide a highly efficient, durable braking mechanism which is positive in operation and which has greater braking efficiency than devices extensively utilized at this time.

More specifically it is an object of my invention to provide an efficient, comparatively simple brake including a pair of cooperating braking elements both of which serve to retard and check the movement of a rotating element, the positive operation of one of said elements being brought about by the initial operation of the other element.

Another object is to provide mechanism of the class described wherein the several working elements may be conveniently and compactly housed and protected from dirt and moisture and wherein the several movable parts, including the housing, brake band and connection members are all supported from a stationary disk or analogous member which may be conveniently mounted on the axle housing or stationary axle of a vehicle.

Another object is to provide a brake mechanism wherein the operation of the main braking elements is brought about through the temporary frictional connection with a wheel or rotating element and where further said frictional connection will cooperate with the braking effect of said main elements to assist in retarding and checking the rotary movement of the wheel.

These and other objects and advantages of the invention will be fully set forth in the following description made in connection with the accompanying drawings, in which like reference characters refer to similar parts throughout the several views, and wherein:—

Fig. 1 is a cross section taken on the line 1—1 of Fig. 2 showing the body of the brake housing and the operating parts within in plan;

Fig. 2 is a vertical section taken on the line 2—2 of Fig. 1 with the disk or cover for the brake housing included;

Figure 3:
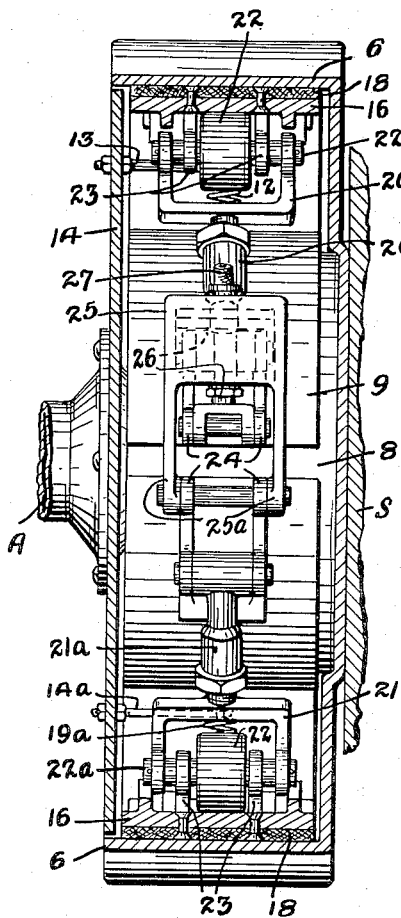
Fig. 3 is a vertical section through the brake housing and brake shoes only and taken on substantially the line 2—2 of Fig. 1, but showing the thrust yokes and toggle connections in full.
Figure 4:
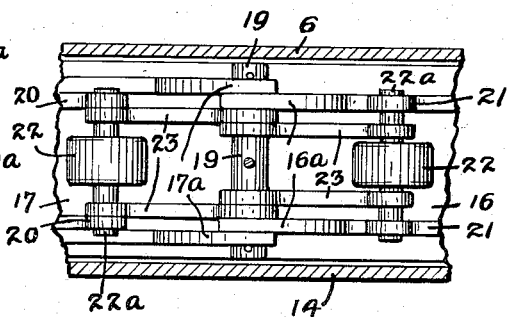
Fig. 4 is a horizontal section taken on the line 4—4 of Fig. 1 showing the slidable connection between the lapping ends of the brake shoes.
Figure 5:
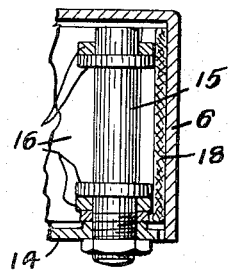
Fig. 5 is a fragmentary section taken on the line 5—5 of Fig. 1 showing the manner in which the brake shoes are pivotally mounted upon the heavy stationary disk or cover for the housing.

The embodiment of the invention illustrated is applied to a vehicle wheel having the usual spokes S and hub H which is revolubly mounted upon the outer end of a tubular axle housing A by means of suitable bearings. My mechanism includes a relatively large cylindrical brake housing 6 which is disposed axially upon the inner side of the wheel proper and which may be secured thereto by suitable means, such as bolts 7. Asosciated with and rigidly secured to housing 6 is a concentric inner drum 8 of a slightly less height than housing 6 and having a turned annular flange 8a which may also be secured to the wheel proper by means of the said bolts 7. Housing 6 and drum 8 cooperate to define the substantially large annular chamber wherein the braking elements, actuating elements and connection members of my mechanism are mounted.

A suitable brake band 9 surrounds drum 8 and is provided with an internal liner 10 of suitable fabric or fibrous material. Brake band 9 is made of some resilient material, such as spring metal and is loosely supported within the brake housing 6 by a series of thrust yokes and also by means of a heavy coiled spring 12, the outer end of which, as shown, is connected with a horizontal pin 13 projecting inwardly from a stationary disk 14 which constitutes the cover for the brake housing. Disk 14 is disposed vertically and is rigidly affixed to the axle housing A, and, as shown, has its periphery enclosed by the rim of housing 6.

The heavy disk 14 rigidly carries a pair of oppositely disposed stub shafts or heavy pins, projecting inwardly into housing 6 and terminating short of the vertical face or flange of said housing. A pair of large semi-circular brake shoes 16 and 17 respectively are pivotally mounted upon the heavy pins 15 in close spaced relation to the cylindrical portion of casing 6 and said shoes are provided with suitable brake linings 18 which are adapted to engage the housing when the brake is applied. The respective ends of the brake shoes 16 and 17 are disposed in close spaced relation and as shown the two shoes have inturned longitudinal flanges at each of their edges, said flanges terminating in bifurcated extremities 16a and 17a respectively, the extremities of the two shoes overlapping and defining, in cooperation, slots which confine the heavy pivot members or pins 19 of toggle devices which are interposed between the brake shoes and the brake band 9. As shown, two pairs of said toggle devices are employed and each constitutes two thrust yokes 20 and 21 respectively, adjustably connected with shanks 20a and 21a respectively, the inner ends of said shanks being pivotally connected to suitable brackets fixed to the exterior of the brake band. Thrust yokes 20 and 21 are provided with roller shafts 22a and thrust rollers 22 are rotatably mounted on said shafts bearing against the internal faces of the shoes 16 and 17. Both of the shafts 22a are pivotally connected to the heavy pivot member 19 by means of connection yokes 23. Each thrust yoke and its pivotally connected connection yoke 23 in combination constitutes a toggle device which is adapted to be flexed to thrust one of the rollers 22 outwardly against one of the brake shoes when slight rotary movement in one direction or the other is effected upon the brake band 9. The common pivot 19 for the arms of the two toggle mechanisms is confined by the lapping bifurcated ends of the brake shoes, said ends defining a slot and permitting limited movement of the pivot member 19. Two or said toggles including a thrust yoke 20 and a thrust yoke 21 are mounted above the upper half of the brake drum 8, while two similar sets are mounted below the lower half of the brake drum, the yokes 23 thereof being connected to the common pivot member or pin 19, which is confined in the overlapping forked ends of the shoes 16 and 17 adjacent the lower edge of supporting disk 14. The lower pivot pin 19 is yieldingly suspended by means of a coiled spring 19a, the upper end of said coiled spring being supported from a bolt 14a which is rigidly secured to the heavy disk 14 and projects inwardly within the brake housing at a point directly above pivot 19.

Brackets 24 are attached to the ends of brake band 9 and suitable means are provided for drawing said ends together to bind the band against said drum 8.

In the embodiment of the invention illustrated the brake operating means comprises a hydraulic device, although it will, of course, be understood that various other mechanical means may be provided for accomplishing the same purpose.

The hydraulic brake operating device, as shown, includes a plunger housing 25 of elliptical cross section, said housing terminating in depending straps 25a which are pivotally secured to the lower bracket 24. A piston 26 shown in dotted lines in Fig. 3, is slidably mounted in housing 25 and projects through one end of said housing and is connected by a yoke 26a with the upper bracket 24. The upper end of the piston housing or cylinder is connected with a tube or conduit 27 through which fluid may be forced under pressure to actuate the piston 26.

*Operation*

In operation when it is desired to apply my brake mechanism the split ends of the brake band 9 are drawn together by the brake operating mechanism thereby frictionally connecting the band 9 with the drum 8. Movement of the wheel and drum of course produces a slight rotary movement on the band 9 and said band carries with it the connected ends of the thrust yokes. When the vehicle wheels are traveling in a forward direction the two oppositely disposed thrust yokes 20 will be actuated in an outward direction in cooperation with their connected toggle yokes 23 causing an outward thrust of the thrust rollers 22 against the brake shoes 16 and 17. This of course applies the shoes forcibly and frictionally against the interior of the brake housing 6 serving to quickly retard and check the rotary movement of the wheel and housing.

When the vehicle wheels are traveling in opposite or rearward direction the oppositely disposed thrust yokes 21 of the two mechanisms will apply the thrust against the brake shoes 16 and 17.

While the purpose of the brake drum 8 and band 9 is primarily to frictionally connect the brake actuating toggles with the wheel or moving body to set the brake shoes 16 and 17, it will also be noted that brake band 9 has a cooperating braking effect upon the wheel. In other words, the setting of the heavy brake shoes 16 and 17 checks the turning or rotation of the brake drum 9 with the wheel and holds the same to produce a combined braking effect upon both the drum 8 and the brake housing 6.

When the brake operating pedal or lever is released the resiliency of brake band 9 as well as the supporting spring 12 for the brake band causes the band to expand releasing its connection with the drum 8, and the toggle mechanisms return to the normal position shown in Fig. 1, withdrawing the thrust rollers from engagement with the shoes 16 and 17.

In the embodiment of the invention disclosed it will be seen that the thrust yokes 20 and 21 with the connection yokes 23 and common pivots 19 comprise for each wheel a pair of articulated brake setting mechanisms which will move the shoes 16 and 17 against the large casing 6 with great power.

In the operation or setting of the large brake shoes 16 and 17 it will be noted that when two of the oppositely disposed thrust yokes such as the members 20 are forcing their rollers against the shoes a thrust is also imparted in an outward direction through the connection yokes 23 to the free ends of adjacent brake shoes. In other words, when the thrust yoke 20 and its roller 23 are reacting directly against the upper portion of brake shoe 16 the connection yoke 23 will be thrust outwardly and to the left causing the upper pivot member 19 to exert an outward pressure against the adjacent end of shoe 17. Because of this cooperating function, when my mechanism is operated with the wheels moving either forwardly or rearwardly substantially all portions of the large brake shoes are forcibly thrust against the brake housing 6. This provides a very powerful brake operating upon the maximum amount of frictional area.

It will be noted that my braking mechanism comprises comparatively few parts all of which are compactly housed within the housing afforded by casing or drum 6 and the disk 14. The working parts are thus efficiently protected from dirt and moisture.

It will further be seen that with my mechanism great power is developed through the toggle connections and the rotation of the wheels for actually setting the brake. When the brake is released the shoes and band will not drag but will promptly be freed from engagement with the rotating parts including the drum and brake housing.

From the foregoing description it will be seen that I have invented a compact and powerful braking mechanism adapted to withstand hard continued usage and capable of quickly checking the revolution or rotation of the wheels of heavy motor vehicles, such as trucks and busses.

It will, of course, be understood that various changes may be made in the form, details, proportions and arrangement of the parts without departing from the scope of my invention, which, generally stated, consists in a device capable of carrying out the objects above set forth and in the novel parts and combinations of parts disclosed and defined in the appended claims.

What is claimed is:—

1. In brake mechanism, an inner drum connected with a rotary member, such as a wheel, an outer drum surrounding said inner drum and spaced therefrom and also connected with said rotary member, a stationary support at one end of said outer drum, a brake band surrounding said inner drum and loosely supported from means on said stationary member, a plurality of arcuate brake shoes supported from said stationary member and positioned end to end for operating on substantially the entire inner periphery of said outer drum and a series of toggle devices interposed between said brake band and the respective ends of said brake shoes, said toggle devices including thrust elements which are adapted to force said shoes outwardly when said band is drawn about said inner drum.

2. In brake mechanism, an inner drum connected to a rotary member such as a wheel an outer drum surrounding said inner drum and spaced therefrom and also connected to said rotary member, a stationary support, such as a disk at one end of said outer drum, a floating brake band surrounding said inner drum and loosely supported from said stationary member, a plurality of arcuate brake shoes supported from said stationary member for engaging said outer drum, the adjacent ends of said brake shoes cooperating to afford a confining element, a pivot member mounted in each of said confining elements, an articulated mechanism connecting each of said pivot members with said brake band and comprising a pair of toggles each having an arm pivotally connected with said brake band and carrying at its inner end a thrust element adapted to engage one of said shoes to force the same outwardly and means for contracting said brake band to frictionally connect the same with said inner drum.

In testimony whereof I affix my signature.

AMOS J. EVANS.